(12) United States Patent
Karim et al.

(10) Patent No.: US 7,695,313 B2
(45) Date of Patent: Apr. 13, 2010

(54) ELECTRICAL ENCLOSURE, AND PANEL ASSEMBLY AND MOUNTING ASSEMBLY THEREFOR

(75) Inventors: Syed M. Karim, Lincoln, IL (US); Hoyma J. Mazara, Santo Domingo (DO)

(73) Assignee: Eaton Corporation, Cleveland, OH (US)

( * ) Notice: Subject to any disclaimer, the term of this patent is extended or adjusted under 35 U.S.C. 154(b) by 295 days.

(21) Appl. No.: 12/017,877

(22) Filed: Jan. 22, 2008

(65) Prior Publication Data

US 2009/0185336 A1 Jul. 23, 2009

(51) Int. Cl.
*H01R 13/60* (2006.01)
(52) U.S. Cl. .................. 439/540.1; 439/575
(58) Field of Classification Search .......... 439/540.1, 439/701, 532, 718, 717, 575; 361/652
See application file for complete search history.

(56) References Cited

U.S. PATENT DOCUMENTS

| | | | |
|---|---|---|---|
| 4,575,038 A * | 3/1986 | Moore | 248/505 |
| 5,768,091 A | 6/1998 | Vinson et al. | |
| 6,292,076 B1 * | 9/2001 | DeGrazia et al. | 335/202 |
| 7,073,971 B2 * | 7/2006 | Schurr et al. | 403/325 |
| 7,286,340 B2 * | 10/2007 | Karim et al. | 361/647 |
| 7,591,676 B2 * | 9/2009 | Martich et al. | 439/540.1 |
| 2006/0025010 A1 * | 2/2006 | Spitaels et al. | 439/532 |
| 2006/0086530 A1 * | 4/2006 | Knabel | 174/135 |

* cited by examiner

*Primary Examiner*—Neil Abrams
*Assistant Examiner*—Phuong Nguyen
(74) *Attorney, Agent, or Firm*—Martin J. Moran

(57) ABSTRACT

A mounting assembly includes a DIN rail for removably securing a number of electrical switching apparatus such as, for example circuit breakers, to a panel member of an electrical enclosure. First and second mounting members extend outwardly from first and second ends, respectively, of the DIN rail. Each mounting member has at least one lateral protrusion. The first and second mounting members are, for example, a number of first resilient legs and a number of second resilient legs, respectively, each of which is structured to bias a corresponding one of the lateral protrusions into engagement with one of the coupling elements of the panel member. The DIN rail, the number of first resilient legs, and the number of second resilient legs are structured to removably secure the circuit breakers to the panel member of the electrical enclosure, without requiring a number of separate fasteners.

18 Claims, 5 Drawing Sheets

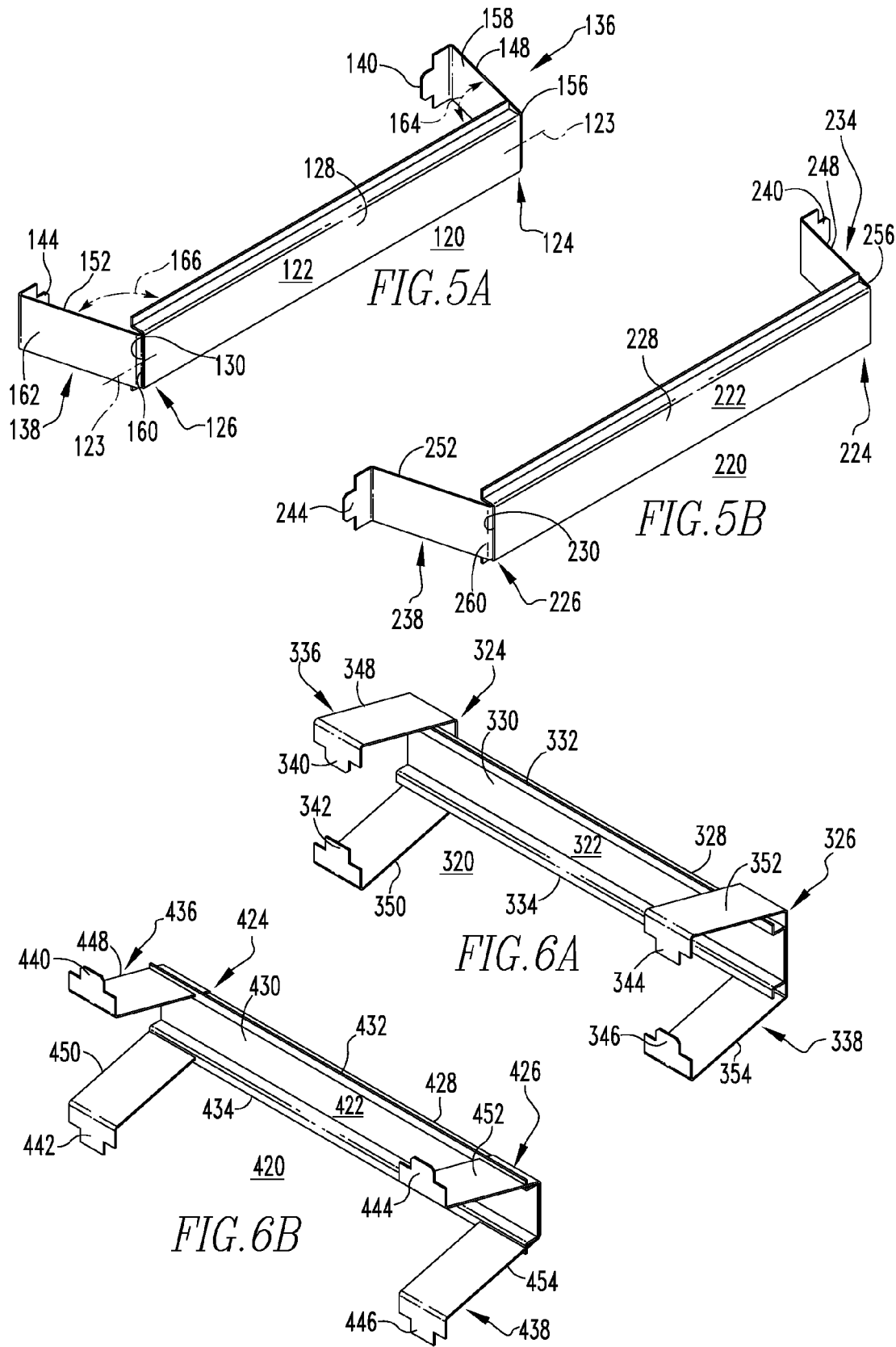

ELECTRICAL ENCLOSURE, AND PANEL ASSEMBLY AND MOUNTING ASSEMBLY THEREFOR

BACKGROUND OF THE INVENTION

1. Field of the Invention

The invention relates generally to electrical enclosures and, more particularly, to electrical enclosures, such as load centers. The invention also relates to mounting assemblies for electrical enclosures. The invention further relates to panel assemblies for electrical enclosures.

2. Background Information

Electrical switching apparatus used in power distribution systems are often mounted within an electrical enclosure (e.g., without limitation, a panelboard; a load center) either individually or in combination with other switchgear (e.g., without limitation, circuit switching devices and circuit interrupters such as circuit breakers, contactors, motor starters, motor controllers and other load controllers).

Circuit breakers, for example, are sometimes mounted collectively on a panel member of a load center. Typically, the circuit breakers are disposed side-by-side in a row, with each circuit breaker being coupled to a DIN rail. DIN is short for Deutsches Insitut für Normung eV, which is a standard-setting organization for Germany. Accordingly, a DIN rail is a connecting rail structure that is designed to satisfy DIN standards. More specifically, some manufacturers of circuit breakers provide the circuit breaker with a DIN rail mounting structure, such as for example, an integrally molded recess sized to provide snap-on attachment to the edges of the DIN rail.

Spacing within the load center is often at a premium. Accordingly, it is desirable for the DIN rail and circuit breakers to occupy minimal space. It is also desirable for the DIN rail and/or the circuit breakers that are secured thereby to be able to be quickly and easily installed, exchanged, removed and/or adjusted.

There is room for improvement in electrical enclosures such as, for example, load centers. There is also room for improvement in panel assemblies and mounting assemblies for electrical enclosures.

SUMMARY OF THE INVENTION

These needs and others are met by embodiments of the invention, which are directed to a mounting assembly for mounting a number of electrical switching apparatus such as, for example, circuit breakers, to a panel member of an electrical enclosure (e.g., without limitation, a load center; a panelboard), preferably without requiring a number of separate fasteners.

As one aspect of the invention, a mounting assembly is provided for mounting a number of electrical switching apparatus in an electrical enclosure. The electrical enclosure includes a panel assembly having a panel member with a plurality of coupling elements. The mounting assembly comprises: a DIN rail structured to removably secure the number of electrical switching apparatus to the panel member, the DIN rail comprising a first end and a second end disposed opposite and distal from the first end; a first mounting member structured to extend outwardly from the first end of the DIN rail toward the panel member of the electrical enclosure, the first mounting member including at least one first lateral protrusion structured to engage a first corresponding one of the coupling elements of the panel member; and a second mounting member structured to extend outwardly from the second end of the DIN rail toward the panel member, the second mounting member including at least one second lateral protrusion structured to engage a different second corresponding one of the coupling elements of the panel member.

The first mounting member may comprise a number of first resilient legs, and the second mounting member may comprise a number of second resilient legs. Each of the first resilient legs may be structured to bias a corresponding first lateral protrusion into engagement with the first corresponding one of the coupling elements of the panel member, in order to secure the first end of the DIN rail to the panel member. Each of the number of second resilient legs may be structured to bias a corresponding second lateral protrusion into engagement with the different second corresponding one of the coupling elements of the panel member, in order to secure the second end of the DIN rail to the panel member. The DIN rail, the number of first resilient legs, and the number of second resilient legs may be structured to removably secure the number of electrical switching apparatus to the panel member of the electrical enclosure, without a number of separate fasteners.

The number of first resilient legs may be a first resilient leg, and the number of second resilient legs may be a second resilient leg. The DIN rail may further comprise a first side and a second side disposed opposite the first side, wherein the first resilient leg is coupled to one of: (a) the first side of the DIN rail, and (b) the second side of the DIN rail, at or about the first end of the DIN rail, and the second resilient leg is coupled to one of: (a) the first side of the DIN rail, and (b) the second side of the DIN rail, at or about the second end of the DIN rail. The first lateral protrusion may be a first tab and the second lateral protrusion may be a second tab, wherein the first tab and the second tab extend one of: (a) laterally inwardly toward each other, and (b) laterally outwardly away from each other.

Alternatively, the number of first resilient legs may be a pair of first resilient legs, and the number of second resilient legs may be a pair of second resilient legs, wherein the at least one first lateral protrusion is a first tab disposed on one leg of the pair of first resilient legs and a second tab disposed on the other leg of the pair of first resilient legs. The first tab and the second tab may extend one of: (a) laterally inwardly toward each other, and (b) laterally outwardly away from each other. One leg of the pair of first resilient legs may extend outwardly from the first edge of the DIN rail at or about the first end of the DIN rail, and the other leg of the pair of first resilient legs may extend outwardly from the second edge of the DIN rail at or about the first end of the DIN rail. The at least one second lateral protrusion may be a third tab disposed on one leg of the pair of second resilient legs and a fourth tab disposed on the other leg of the pair of second resilient legs, wherein the third tab and the fourth tab extend one of: (a) laterally inwardly toward each other, and (b) laterally outwardly away from each other. One leg of the pair of second resilient legs may extend outwardly from the first edge of the DIN rail at or about the second end of the DIN rail, and the other leg of the pair of second resilient legs may extend outwardly from the second edge of the DIN rail at or about the second end of the DIN rail.

As another aspect of the invention, a panel assembly is provided for an electrical enclosure. The panel assembly comprises: a panel member including a plurality of coupling elements; a number of electrical switching apparatus; and a mounting assembly comprising: a DIN rail structured to removably secure the number of electrical switching apparatus to the panel member, the DIN rail comprising a first end and a second end disposed opposite and distal from the first end, a first mounting member extending outwardly from the first end of the DIN rail toward the panel member, the first mounting member including at least one first lateral protrusion engaging a first corresponding one of the coupling elements of the panel member, and a second mounting member extending outwardly from the second end of the DIN rail toward the panel member, the second mounting member including at least one second lateral protrusion engaging a different second corresponding one of the coupling elements of the panel member.

As another aspect of the invention, an electrical enclosure comprises: a housing; and a panel assembly comprising: a panel member including a plurality of coupling elements, a number of electrical switching apparatus, and a mounting assembly comprising: a DIN rail removably securing the number of electrical switching apparatus to the panel member, the DIN rail comprising a first end and a second end disposed opposite and distal from the first end, a first mounting member extending outwardly from the first end of the DIN rail toward the panel member, the first mounting member including at least one first lateral protrusion engaging a first corresponding one of the coupling elements of the panel member, and a second mounting member extending outwardly from the second end of the DIN rail toward the panel member, the second mounting member including at least one second lateral protrusion engaging another different second one of the coupling elements of the panel member.

BRIEF DESCRIPTION OF THE DRAWINGS

A full understanding of the invention can be gained from the following description of the preferred embodiments when read in conjunction with the accompanying drawings in which:

FIGS. 5A, 5B, 6A, 6B, 7 and 8 are isometric views of portions of mounting assemblies in accordance with other embodiments of the invention.

DESCRIPTION OF THE PREFERRED EMBODIMENTS

Figure 1:
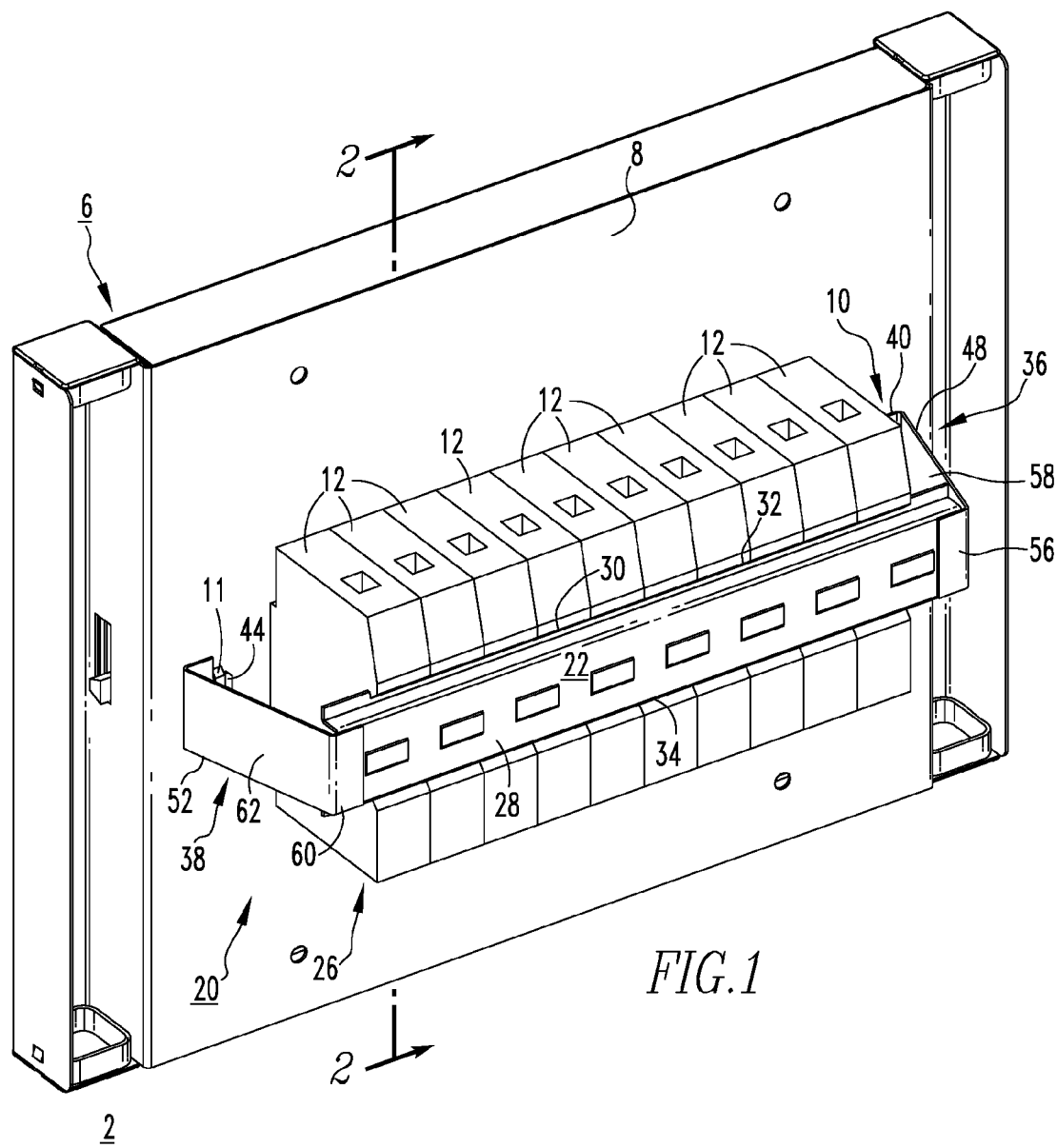
FIG. 1 is an isometric view of a panel assembly for a load center and a mounting assembly therefor, in accordance with an embodiment of the invention.

Directional phrases used herein, such as, for example, left, right, top, bottom and derivatives thereof, relate to the orientation of the elements shown in the drawings and are not limiting upon the claims unless expressly recited therein.

As employed herein, the term "fastener" shall mean a separate element or elements which is/are employed to connect or tighten two or more components together, and expressly includes, without limitation, rivets, pins, screws, bolts and the combinations of bolts and nuts (e.g., without limitation, lock nuts) and bolts, washers and nuts.

As employed herein, the term "resilient" refers to the flexible nature of the mounting members of the disclosed mounting assembly, which is facilitated in large part by the material from which they are made. Specifically, the material (e.g., without limitation, metal) can be temporarily flexed or deflected from a natural position in which no external force is acting upon it, to a deflected position in which it is deflected or displaced from its natural position in response to being engaged and moved by an external force. Upon removing the external force, it will substantially return to the natural position. For example, in this manner, the resilient mounting members of the disclosed mounting assembly provide desired biasing forces, as will be discussed in detail herein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 2:
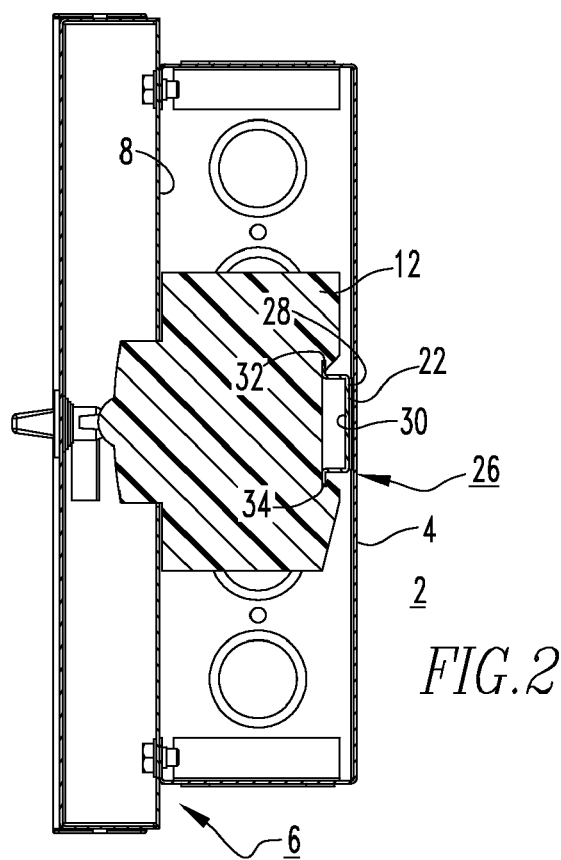
FIG. 2 is a sectional view taken along line 2-2 of FIG. 1, except also showing the cover of the load center.

FIG. 1 shows a mounting assembly 20 for an electrical enclosure such as, for example and without limitation, a load center 2 (partially shown in FIG. 1; shown in cross-section in FIG. 2). As shown in FIG. 2, the electrical enclosure 2 includes a housing 4 and a panel assembly 6. The panel assembly 6 includes a panel member 8 having a plurality of coupling elements 10 (partially shown in FIG. 1), 11 (FIGS. 1 and 3) and a number of electrical switching apparatus such as, for example and without limitation, a plurality of circuit breakers 12 (FIG. 1; one circuit breaker 12 is shown in section view in FIG. 2; one circuit breaker 12 is partially shown in FIG. 3). The housing 4 of the electrical enclosure 2 is coupled to the panel member 8 and overlays the circuit breakers 12, as shown in FIG. 2.

Figure 4:
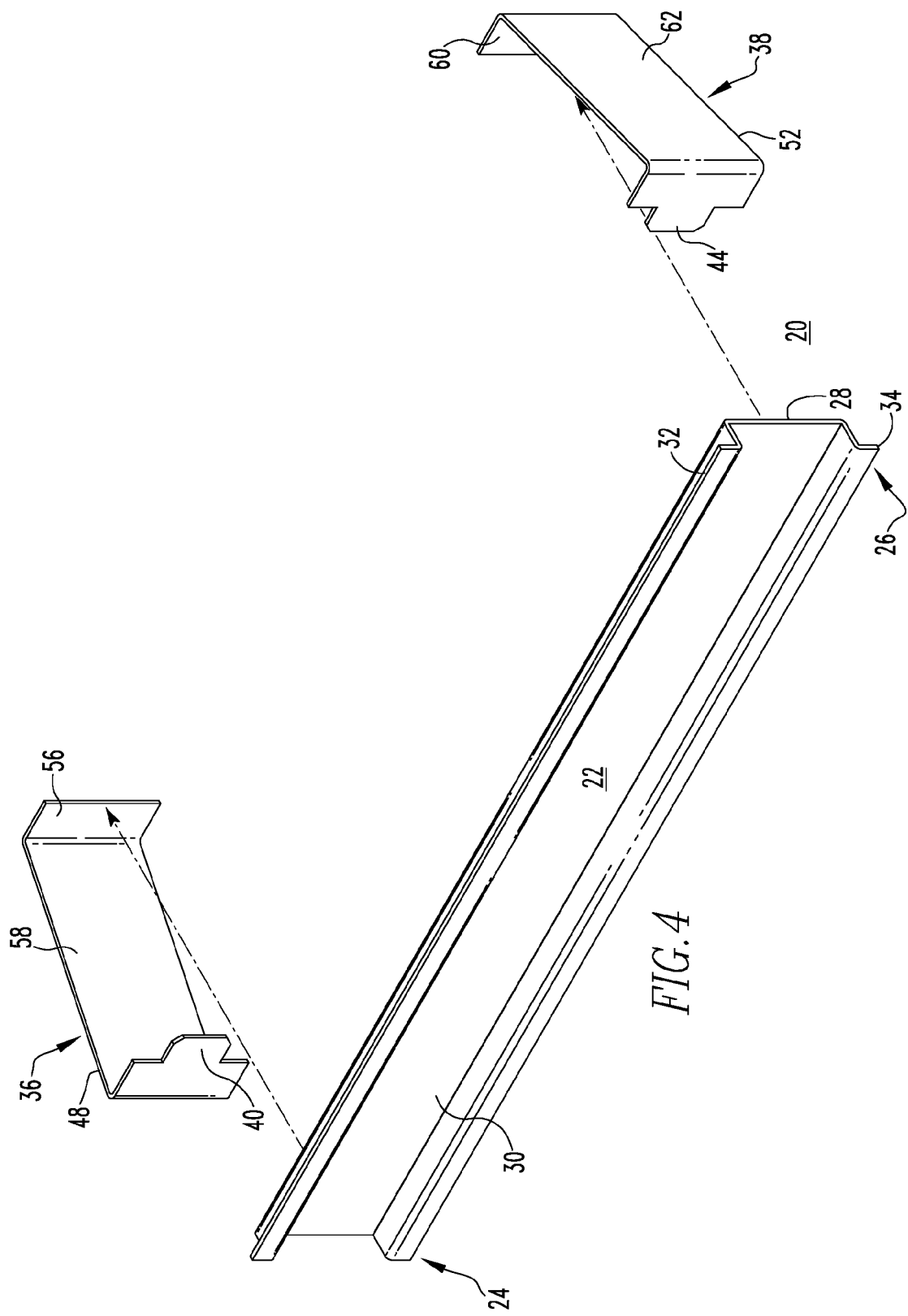
FIG. 4 is an exploded isometric view of the mounting assembly of FIG. 1.

A DIN rail 22 of the mounting assembly 20 removably secures the circuit breakers 12 to the panel member 8, preferably without requiring a number of separate fasteners, as will be described herein. Referring to FIGS. 1 and 4, it will be appreciated that the DIN rail 20 includes a first end 24, a second end 26 disposed opposite and distal from the first end 24, a first side 28 facing away from the panel member 8 (FIG. 1), a second side 30 opposite the first side 28, and first and second opposing edges 32,34. As best shown in FIG. 2, the circuit breakers 12 (one circuit breaker 12 is shown in FIG. 2) are preferably structured to be removably coupled to the DIN rail 22 at or about the first and second edges 32,34 thereof in a generally well known manner. It will be appreciated that the DIN rail 22 and/or other components of the mounting assembly 20 can be made from any known or suitable material including, but not limited to, metal. It will also be appreciated that the DIN rail 22 and/or other components of the mounting assembly 20 may be customized in accordance with the invention to include a wide variety of different configurations and/or shapes, expressly including but not limited to those which are shown and described herein.

Referring again to FIG. 1 and also to FIG. 4, a first mounting member 36 extends outwardly from the first end 24 of the DIN rail 22, toward the panel member 8 (FIG. 1) of the panel assembly 6 (FIG. 1). The first mounting member 36 includes at least one first lateral protrusion such as, for example and without limitation, a first tab 40, which engages a first corresponding one 10 of the coupling elements 10,11 of the panel member 8. Similarly, a second mounting member 38 extends outwardly from the second end 26 of the DIN rail 22 toward the panel member 8 (FIG. 1), and at least one second lateral protrusion such, for example and without limitation, a second tab 44 of the second mounting member 38 engages a different second one 11 of the coupling elements 10,11 of the panel member 8.

Figure 3:
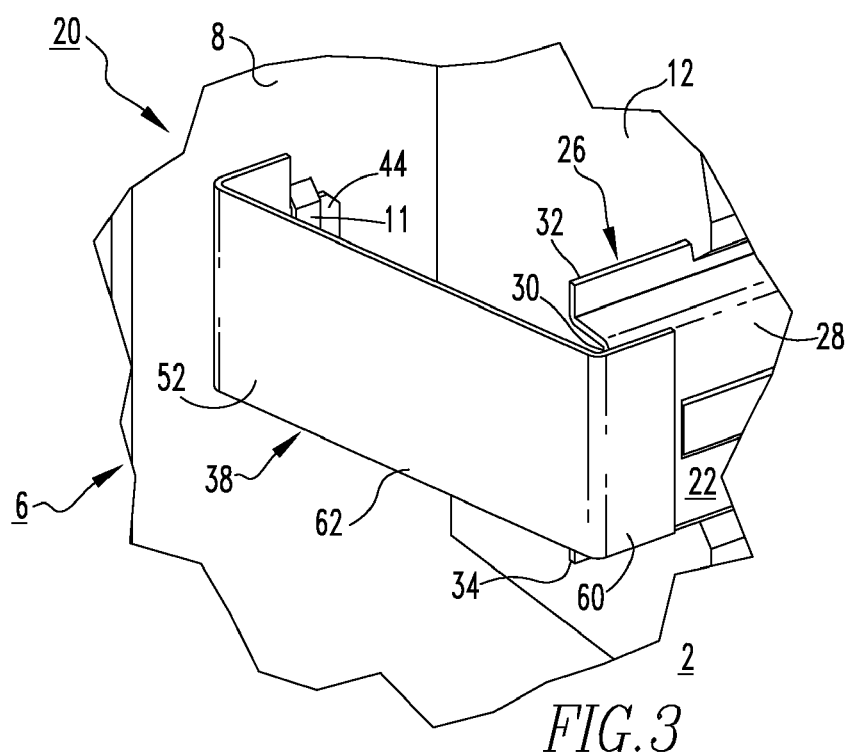
FIG. 3 is an isometric close-up view of a portion of the panel assembly and mounting assembly therefor of FIG. 1.

FIG. 3 provides an enlarged view of the second end 26 of the DIN rail 22 and the second mounting member 38 therefor. As shown, the coupling elements 10,11 (only coupling element 11 is shown in FIG. 3) of the panel member 8 in the example of FIGS. 1-3, are protruded bands 10,11 (e.g., straps of material (e.g., without limitation, metal) under which tabs 40,44, respectively, can be inserted) (only protruded band 11 is shown in FIG. 3), wherein the lateral protrusions (e.g., without limitation, tabs 40,44) of the mounting assembly 20 are structured to be removably disposed in (e.g., inserted beneath) the protruded band 11, in order to removably secure a corresponding end (e.g., second end 26) of the DIN rail 22 and, therefore, the plurality of circuit breakers 12 (one circuit breaker 12 is partially shown in FIG. 3) to the panel member 8 (partially shown in FIG. 3) of the electrical enclosure 2.

For simplicity of illustration, the panel assembly 6 and panel member 8 and coupling elements 10 (partially shown in FIG. 1), 11 therefor are only shown in FIGS. 1, 3 (partially shown) and 7 (partially shown). It will, however, be appreciated that all of the lateral protrusions (e.g., without limitation, tabs) of the mounting assemblies 20 (FIGS. 1-4), 120 (FIG. 5A), 220 (FIG. 5B), 320 (FIG. 6A), 420 (FIG. 6B), 520 (FIG. 7), 620 (FIG. 8) shown and described herein are structured to be removably secured to the panel member 8 (FIGS. 1-3 and 7) or a suitable variation thereof (not shown) in substantially the same manner. It will, however, be appreciated that there may be any known or suitable number and/or configuration of panel coupling elements (e.g., protruded bands 10,11 of FIG. 1; other suitable coupling elements (not shown)) and lateral protrusions (e.g., without limitation, tabs 40,44 (FIGS. 1-4); tabs 140,144 (FIG. 5A); tabs 240,244 (FIG. 5B); tabs 340, 342,344,346 (FIG. 6A); tabs 440,442,444,446 (FIG. 6B); for engaging the same, without departing from the scope of the invention.

Figure 7:
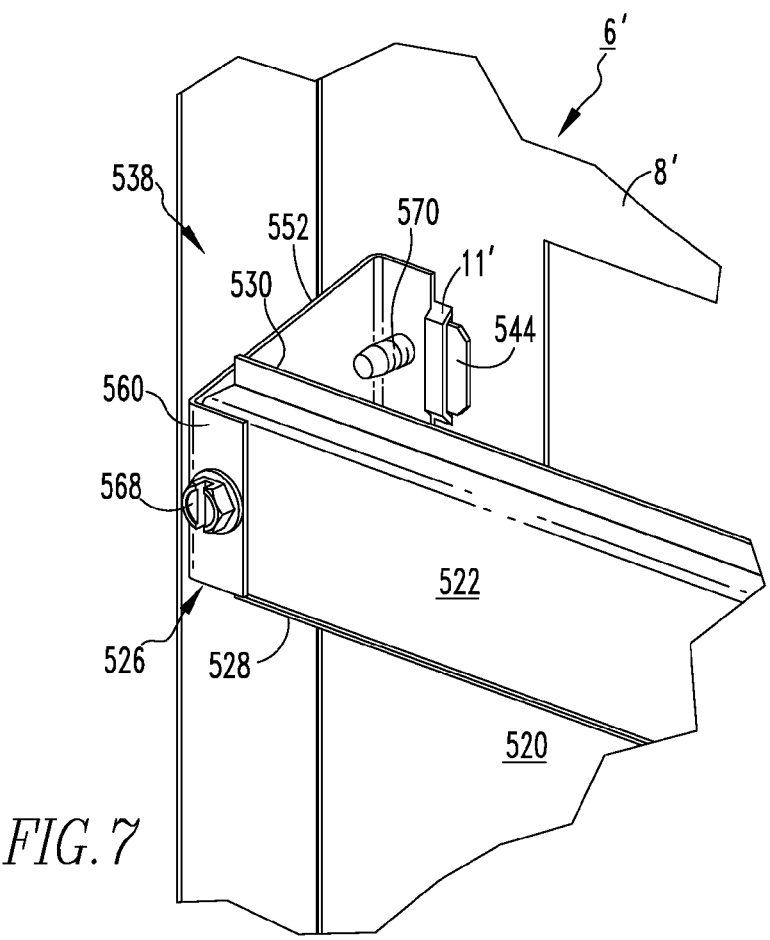

It will, therefore, be appreciated that the disclosed mounting assembly 20 enables a plurality of circuit breakers 12 (FIG. 1) to be coupled to the DIN rail 22, for example, in the form of a sub-assembly, which can then be removably coupled to the panel member 8 (FIG. 1), without requiring a number of separate fasteners (see, for example, the optional fasteners 568 and 570 of FIG. 7). Although such fasteners 568,570 (FIG. 7) can be employed, for example, to further secure the mounting assembly 520 (FIG. 7) to the panel member 8 (partially shown in FIG. 7), they are not required. Thus, it will be appreciated that the circuit breakers 12, can be relatively quickly and easily installed, exchanged, removed and/or adjusted in comparison, for example, to known panel assemblies (not shown), which do not have protruded bands (e.g., 10,11) but rather require a number of separate fasteners (not shown) and/or which employ a DIN rail (not shown) that is not removable.

The first and second mounting members 36 and 38 of the example mounting assembly 20 are a number of first and second legs 48,52, which, to facilitate the removable engagement between the mounting assembly 20 and panel member 8 of the electrical enclosure 2 are made from a suitable resilient (as defined herein) material such as, for example and without limitation, relatively thin metal (e.g., without limitation, 0.032 inch spring steel). Although the legs 48,52 are not required to be resilient, it will be appreciated that resilient legs 48,52 function as springs to bias tabs 40,44 into engagement with the coupling elements 10,11, respectively, or otherwise maintain engagement with the coupling elements 10,11 of the electrical enclosure panel member 8, as shown in FIG. 1. In the example of FIGS. 1 and 4, the first mounting member 36 is a single first resilient leg 48, which includes the aforementioned first tab 40, a rail portion 56 disposed at or about the first end 24 of the DIN rail 22, and an intermediate portion 58 extending between the first tab 40 and rail portion 56. Similarly, the second mounting member 38 is a single second resilient leg 52 including the aforementioned second tab 44, a rail portion 60 disposed at or about the second end 26 of the DIN rail 22, and an intermediate portion 62 extending between the second tab 44 and rail portion 60. The rail portions 56 and 60 of the first and second resilient legs 48 and 52 are coupled at or about the first and second ends 24 and 26, respectively, of the DIN rail 22 on the first side 28 of the DIN rail 22, and the first and second tabs 40,44 extend laterally inwardly toward each other. It will, however, be appreciated that the mounting members (e.g., 36,38) can have any suitable number and/or configuration of legs (e.g., 48,52), which can be coupled to the DIN rail (e.g., 22) in any known or suitable manner (e.g., without limitation, fasteners; welding) and/or configuration.

The following EXAMPLES, which are provided for purposes of illustration only, and are not intended to limit the scope of the invention in any way, demonstrate some of the many possible mounting assembly embodiments in accordance with the invention. For simplicity of illustration and economy of disclosure, only a portion of the mounting assembly may be shown and described in each EXAMPLE. Components of each assembly, which are substantially similar in each embodiment, may not be repetitively discussed.

Example 1

FIG. 5A shows a mounting assembly 120 wherein the mounting members 136,138 are first and second resilient legs 148,152. However, the rail portions 156 and 160 of the first and second resilient legs 148 and 152 are coupled to the first and second ends 124 and 126, respectively, of the DIN rail 122, on the second side 130 of the DIN rail 122, as opposed to the first side 128. The first and second tabs 140,144 of the mounting assembly 120 in the example of FIG. 5A extend laterally inwardly toward each other. The legs 148,152 of the mounting assembly 120 are positioned with respect to DIN rail 122 substantially similarly to the positions of legs 48,52 with respect to DIN rail 22, previously discussed in connection with FIGS. 1 and 4. More specifically, the DIN rail 122 has a plane 123. The first leg 148 forms a first interior angle 164 between the plane 123 of the DIN rail 122 and the inside surface of the intermediate portion 158 of the first leg 148. Similarly, a second interior angle 166 is formed between the inside surface of the intermediate portion 162 of the second leg 152 and the plane 123 of the DIN rail 122. Preferably, the first and second interior angles 164,166 are substantially the same. The interior angles 164,166 of the example of FIG. 5A are greater than 90 degrees. It will, however, be appreciate that the legs 148,152 could be positioned at any suitable angle with respect to the DIN rail 122.

Example 2

FIG. 5B shows a mounting assembly 220 wherein the mounting members 236,238 are first and second legs 248, 252. Like the aforementioned rail portions 156 and 160 of first and second resilient legs 148 and 152, described above with respect to FIG. 5A, the rail portions 256 and 260 of the first and second resilient legs 248 and 252 are coupled to the first and second ends 224 and 226, respectively, of DIN rail 222, on the second side 230 thereof. However, the first and second tabs 240,244 of the mounting assembly 220 in the example of FIG. 5B extend laterally outwardly away from each other.

Example 3

FIG. 6A shows a mounting assembly 320 wherein the first mounting member 336 is a pair of first resilient legs 348,350 extending outwardly from the DIN rail 322 at or about the first end 324 thereof. Specifically, one 348 of the pair of first resilient legs 348,350 extends from the first edge 332 of the DIN rail 322, and the other 350 of the pair of first resilient legs 348,350 extends outwardly from the second edge 334 of the DIN rail 322. Resilient leg 348 has a first tab 340 and resilient leg 350 has a second tab 342, wherein the first and second tabs 340,342 extend laterally inwardly toward each other. Similarly, the second mounting member 338 is a pair of second resilient legs 352,354 coupled at or about the second end 326 of the DIN rail 322. One 352 of the pair of second resilient legs 352,354 extends outwardly from the first edge 332 of the DIN rail 322 and the other 354 of the pair of second resilient legs 352,354 extends outwardly from the second edge 334 of the DIN rail 322, as shown. Resilient leg 352 includes a third tab 344 and resilient leg 354 includes a fourth tab 346, wherein the third and fourth tabs 344,346 extend laterally inwardly toward each other. Both the first and second mounting members 336 and 338 are coupled to the first side 328 of the DIN rail 322 and extend toward, and beyond, the second side 330 of the DIN rail 322.

Example 4

FIG. 6B illustrates an example mounting assembly 420, which is substantially similar to mounting assembly 320, previously discussed hereinabove with respect to FIG. 6A. Specifically, the first mounting member 436 is a pair of first resilient legs 448,450 extending outwardly from the DIN rail 422 at or about the first end 424 thereof. One 448 of the pair of first resilient legs 448,450 extends from the first edge 432 of the DIN rail 422, and the other 450 of the pair of first resilient legs 448,450 extends outwardly from the second edge 434 of the DIN rail 422. However, resilient leg 448 has a first tab 440 and resilient leg 450 has a second tab 442, wherein the first and second tabs 440,442 extend laterally outwardly away from each other, as opposed to first and second tabs 340,342 of FIG. 6A, which extend laterally inwardly toward each other, as previously discussed. Similarly, a second mounting member 438 is a pair of second resilient legs 452,454 coupled at or about the second end 426 of the DIN rail 422. One 452 of the pair of second resilient legs 452,454 extends outwardly from the first edge 432 of the DIN rail 422 and the other 454 of the pair of second resilient legs 452,454 extends outwardly from the second edge 434 of the DIN rail 422, as shown. Resilient leg 452 includes a third tab 444 and resilient leg 454 includes a fourth tab 446, wherein the third and fourth tabs 444,446 extend laterally outwardly away from each other. Both the first and second mounting members 436 and 438 are coupled to the first side 428 of the DIN rail 422 and extend toward, and beyond, the second side 430 of the DIN rail 422.

Example 5

FIG. 7 shows a mounting assembly 520 employing a number of optional fasteners 568,570 to further secure the mounting members (only mounting member 538 is shown in FIG. 7) to the DIN rail 522 and/or the panel member 8' of the panel assembly 6'. More specifically, in the example of FIG. 7, a first screw 568 extends through the rail portion 560 of the resilient leg 552 to secure it to the first side 528 of the DIN rail 522 at or about the second end 526 thereof. It will, however, be appreciated that the resilient leg 552 could alternatively be coupled to the DIN rail 522 in any known or suitable configuration and by any known or suitable manner (e.g., without limitation, welding; rivets, glue), without departing from the scope of the invention. In FIG. 7, a second screw 570 (partially shown) extends through the panel member 8' and the tab 544 of the resilient leg 552, adjacent the coupling element 11' of the panel member 8'. It will, however, be appreciated that fasteners (e.g., 568,570) are not required in accordance with the disclosed invention.

Example 6

Figure 8:
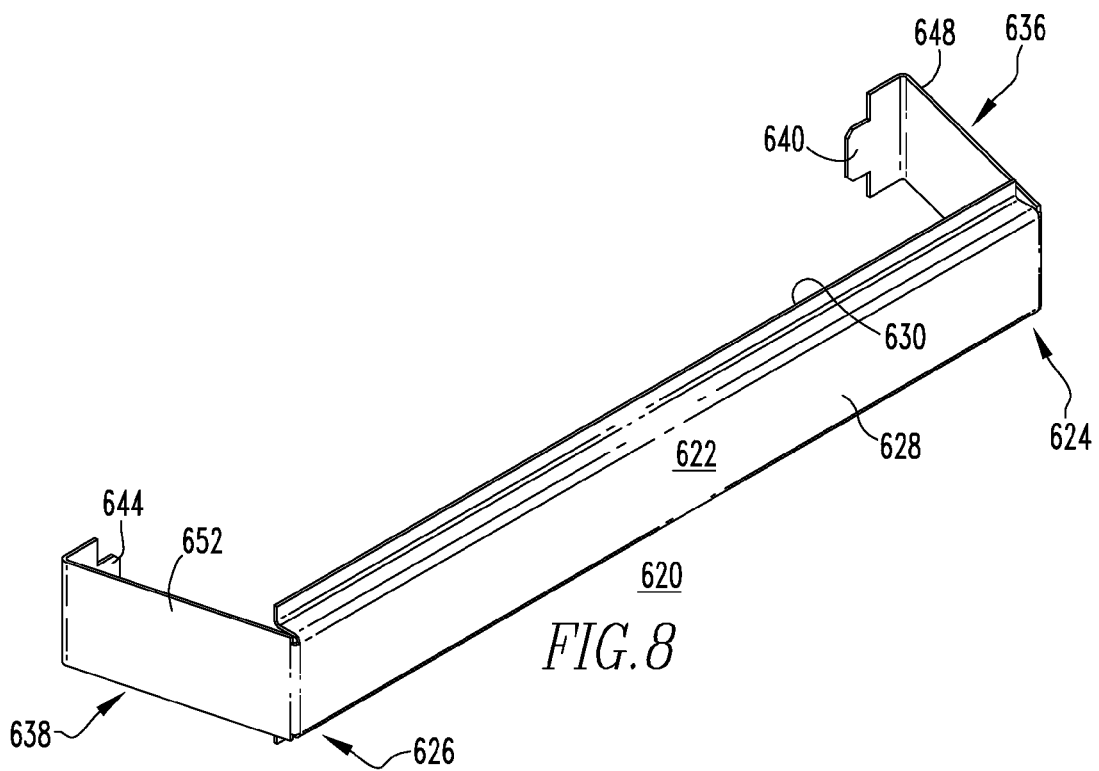

The example mounting assembly 620 alternatively consists of a single piece member 622 made of a single continuous piece of material (e.g., without limitation, metal), as shown in the example of FIG. 8. Specifically, the DIN rail 622, first resilient leg 648 of the first mounting member 636 and second resilient leg 652 of the second mounting member 638 are different segments of the same continuous piece of material.

In FIG. 8, the first leg 648 extends outwardly from the first end 624 of the DIN rail 622 and includes a first tab 640. The second leg 652 extends outwardly from the second end 626 of the DIN rail 622 and includes a second tab 644. The first and second tabs 640,644 extend laterally inwardly toward each other, although it will be appreciated that they could be disposed in any known or suitable alternative configuration (e.g., without limitation, extending laterally outwardly away from each other), without departing from the scope of the invention.

It will be appreciated that, in operation, the resilient legs (e.g., 648,652) of the mounting assembly (e.g., 620) can be deflected (e.g., moved inwardly or outwardly with respect to FIG. 8), in order to position the tabs 640 and 644, as desired, with respect to the coupling elements (e.g., without limitation, protruded bands 10 and 11 of FIG. 1) of the panel member 8 (FIG. 1), and thereby secure the mounting assembly (e.g., 620) and circuit breakers 12 (FIG. 1) thereto.

Accordingly, the disclosed mounting assemblies 20 (FIGS. 1-4), 120 (FIG. 5A), 220 (FIG. 5B), 320 (FIG. 6A), 420 (FIG. 6B), 520 (FIG. 7), 620 (FIG. 8) provide a unique mechanism for relatively quickly and easily securing a number of electrical switching apparatus (e.g., without limitation, circuit breakers 12) to a panel member 8 of an electrical enclosure (e.g., without limitation, load center 2), as shown in FIG. 1, without requiring a number of separate fasteners.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A mounting assembly for mounting a number of electrical switching apparatus in an electrical enclosure, said electrical enclosure including a panel assembly, said panel assembly having a panel member with a plurality of coupling elements, said mounting assembly comprising:

a DIN rail structured to removably secure said number of electrical switching apparatus to said panel member, said DIN rail comprising a first end and a second end disposed opposite and distal from the first end;

a first mounting member structured to extend outwardly from the first end of said DIN rail toward the panel member of said electrical enclosure, said first mounting member including at least one first lateral protrusion structured to engage a first corresponding one of said coupling elements of said panel member; and a second mounting member structured to extend outwardly from the second end of said DIN rail toward said panel member, said second mounting member including at least one second lateral protrusion structured to engage a different second corresponding one of said coupling elements of said panel member;

wherein said first mounting member comprises a number of first resilient legs; wherein said second mounting member comprises a number of second resilient legs; wherein each of said number of first resilient legs is structured to bias a corresponding one of said at least one first lateral protrusion into engagement with said first corresponding one of said coupling elements of said panel member, in order to secure the first end of said DIN rail to said panel member; and wherein each of said number of second resilient legs is structured to bias a corresponding one of said at least one second lateral protrusion into engagement with said different second corresponding one of said coupling elements of said panel member, in order to secure the second end of said DIN rail to said panel member.

2. The mounting assembly of claim 1 wherein said DIN rail, said number of first resilient legs, and said number of second resilient legs are structured to removably secure said number of electrical switching apparatus to the panel member of said electrical enclosure, without a number of separate fasteners.

3. The mounting assembly of claim 1 wherein said DIN rail further comprises a first edge and a second edge disposed opposite the first edge; wherein said number of first resilient legs is a pair of first resilient legs; wherein said number of second resilient legs is a pair of second resilient legs; wherein said at least one first lateral protrusion is a first tab disposed on one leg of said pair of first resilient legs and a second tab disposed on the other leg of said pair of first resilient legs; wherein said first tab and said second tab extend one of: (a) laterally inwardly toward each other, and (b) laterally outwardly away from each other; wherein said one leg of said pair of first resilient legs extends outwardly from the first edge of said DIN rail at or about the first end of said DIN rail; wherein said other leg of said pair of first resilient legs extends outwardly from the second edge of said DIN rail at or about the first end of said DIN rail; wherein said at least one second lateral protrusion is a third tab disposed on one leg of said pair of second resilient legs and a fourth tab disposed on the other leg of said pair of second resilient legs; wherein said third tab and said fourth tab extend one of: (a) laterally inwardly toward each other, and (b) laterally outwardly away from each other; wherein said one leg of said pair of second resilient legs extends outwardly from the first edge of said DIN rail at or about the second end of said DIN rail; and wherein said other leg of said pair of second resilient legs extends outwardly from the second edge of said DIN rail at or about the second end of said DIN rail.

4. The mounting assembly of claim 1 wherein each of said first mounting member and said second mounting member includes at least one fastener; and wherein said at least one fastener is structured to further secure said DIN rail and said number of electrical switching apparatus to the panel member of said electrical enclosure.

5. The mounting assembly of claim 1 wherein said number of first resilient legs is a first resilient leg; wherein said number of second resilient legs is a second resilient leg; wherein said at least one first lateral protrusion is a first lateral protrusion; wherein said at least one second lateral protrusion is a second lateral protrusion; wherein said first resilient leg comprises said first lateral protrusion, a rail portion disposed at or about the first end of said DIN rail, and an intermediate portion extending between said first lateral protrusion and said rail portion; and wherein said second resilient leg comprises said second lateral protrusion, a rail portion disposed at or about the second end of said DIN rail, and an intermediate portion extending between said second lateral protrusion and the rail portion of said second resilient leg.

6. The mounting assembly of claim 5 wherein said DIN rail further comprises a first side and a second side disposed opposite the first side; wherein the rail portion of said first resilient leg is coupled to the first side of said DIN rail at or about the first end of said DIN rail; wherein the rail portion of said second resilient leg is coupled to the first side of said DIN rail at or about the second end of said DIN rail; wherein said first lateral protrusion is a first tab; wherein said second lateral protrusion is a second tab; and wherein said first tab and said second tab extend laterally inwardly toward each other.

7. The mounting assembly of claim 5 wherein said DIN rail further comprises a first side and a second side disposed opposite the first side; wherein the rail portion of said first resilient leg is coupled to the second side of said DIN rail at or about the first end of said DIN rail; wherein the rail portion of said second resilient leg is coupled to the second side of said DIN rail at or about the second end of said DIN rail; wherein said first lateral protrusion is a first tab; wherein said second lateral protrusion is a second tab; and wherein said first tab and said second tab extend laterally inwardly toward each other.

8. The mounting assembly of claim 5 wherein said DIN rail further comprises a first side and a second side disposed opposite the first side; wherein the rail portion of said first resilient leg is coupled to the second side of said DIN rail at or about the first end of said DIN rail; wherein the rail portion of said second resilient leg is coupled to the second side of said DIN rail at or about the second end of said DIN rail; wherein said first lateral protrusion is a first tab; wherein said second lateral protrusion is a second tab; and wherein said first tab and said second tab extend laterally outwardly away from each other.

9. The mounting assembly of claim 5 wherein said DIN rail has a plane; wherein the intermediate portion of said first resilient leg forms a first interior angle with respect to said plane of said DIN rail; wherein the intermediate portion of said second resilient leg forms a second interior angle with respect to said plane of said DIN rail; wherein said first interior angle is greater than 90 degrees; wherein said second interior angle is greater than 90 degrees; and wherein said first interior angle is substantially equal to said second interior angle.

10. The mounting assembly of claim 5 wherein said mounting assembly is a single piece member comprising a single continuous piece of material; and wherein said DIN rail, said first resilient leg, and said second resilient leg comprise different segments of said continuous piece of material.

11. A panel assembly for an electrical enclosure, said panel assembly comprising:
a panel member including a plurality of coupling elements;
a number of electrical switching apparatus; and
a mounting assembly comprising:
a DIN rail structured to removably secure said number of electrical switching apparatus to said panel member, said DIN rail comprising a first end and a second end disposed opposite and distal from the first end,
a first mounting member extending outwardly from the first end of said DIN rail toward said panel member, said first mounting member including at least one first lateral protrusion engaging a first corresponding one of said coupling elements of said panel member, and a second mounting member extending outwardly from the second end of said DIN rail toward said panel member, said second mounting member including at least one second lateral protrusion engaging a different second corresponding one of said coupling elements of said panel member;

wherein said first mounting member comprises a number of first resilient legs; wherein said second mounting member comprises a number of second resilient legs; wherein each of said number of first resilient legs biases a corresponding one of said at least one first lateral protrusion into engagement with said first corresponding one of said coupling elements of said panel member, in order to secure the first end of said DIN rail to said panel member; and wherein each of said number of second resilient legs biases a corresponding one of said at least one second lateral protrusion into engagement with said different second corresponding one of said coupling elements of said panel member, in order to secure the second end of said DIN rail to said panel member.

12. The panel assembly of claim 11 wherein said number of electrical switching apparatus is a plurality of circuit breakers; wherein said plurality of coupling elements of said panel member is a plurality of protruded bands; wherein said at least one first lateral protrusion is at least one first tab; wherein said at least one second lateral protrusion is at least one second tab; and wherein said at least one first tab is structured to be removably disposed in a corresponding one of said plurality of protruded bands and said at least one second tab is structured to be removably disposed in another corresponding one of said plurality of protruded bands, in order to removably secure said DIN rail and said plurality of circuit breakers to the panel member of said electrical enclosure, without a number of separate fasteners.

13. The panel assembly of claim 11 wherein said number of first resilient legs is a first resilient leg; wherein said number of second resilient legs is a second resilient leg; wherein said DIN rail further comprises a first side and a second side disposed opposite the first side; wherein said first resilient leg is coupled to one of: (a) the first side of said DIN rail, and (b) the second side of said DIN rail, at or about the first end of said DIN rail; wherein said second resilient leg is coupled to one of: (a) the first side of said DIN rail, and (b) the second side of said DIN rail, at or about the second end of said DIN rail; wherein said first lateral protrusion is a first tab; wherein said second lateral protrusion is a second tab; and wherein said first tab and said second tab extend one of: (a) laterally inwardly toward each other, and (b) laterally outwardly away from each other.

14. The panel assembly of claim 11 wherein said number of first resilient legs is a pair of first resilient legs; wherein said number of second resilient legs is a pair of second resilient legs; wherein said at least one first lateral protrusion is a first tab disposed on one leg of said pair of first resilient legs and a second tab disposed on the other leg of said pair of first resilient legs; wherein said first tab and said second tab extend one of: (a) laterally inwardly toward each other, and (b) laterally outwardly away from each other; wherein said one leg of said pair of first resilient legs extends outwardly from the first edge of said DIN rail at or about the first end of said DIN rail; wherein said other leg of said pair of first resilient legs extends outwardly from the second edge of said DIN rail at or about the first end of said DIN rail; wherein said at least one second lateral protrusion is a third tab disposed on one leg of said pair of second resilient legs and a fourth tab disposed on the other leg of said pair of second resilient legs; wherein said third tab and said fourth tab extend one of: (a) laterally inwardly toward each other, and (b) laterally outwardly away from each other; wherein said one leg of said pair of second resilient legs extends outwardly from the first edge of said DIN rail at or about the second end of said DIN rail; and wherein said other leg of said pair of second resilient legs extends outwardly from the second edge of said DIN rail at or about the second end of said DIN rail.

15. An electrical enclosure comprising:
a housing; and
a panel assembly comprising:
a panel member including a plurality of coupling elements,
a number of electrical switching apparatus, and
a mounting assembly comprising:
a DIN rail removably securing said number of electrical switching apparatus to said panel member, said DIN rail comprising a first end and a second end disposed opposite and distal from the first end,
a first mounting member extending outwardly from the first end of said DIN rail toward said panel member, said first mounting member including at least one first lateral protrusion engaging a first corresponding one of said coupling elements of said panel member, and
a second mounting member extending outwardly from the second end of said DIN rail toward said panel member, said second mounting member including at least one second lateral protrusion engaging a different second one of said coupling elements of said panel member;
wherein the first mounting member of said mounting assembly comprises a number of first resilient legs; wherein the second mounting member of said mounting assembly comprises a number of second resilient legs; wherein each of said number of first resilient legs biases a corresponding one of said at least one first lateral protrusion into engagement with said first corresponding one of said coupling elements of the panel member of said electrical enclosure, in order to secure the first end of said DIN rail to said panel member; and wherein each of said number of second resilient legs biases a corresponding one of said at least one second lateral protrusion into engagement with said different second corresponding one of said coupling elements of the panel member of said electrical enclosure, in order to secure the second end of said DIN rail to said panel member.

16. The electrical enclosure of claim 15 wherein said number of electrical switching apparatus is a plurality of circuit breakers; wherein said plurality of coupling elements of said panel member is a plurality of protruded bands; wherein said at least one first lateral protrusion is at least one first tab; wherein said at least one second lateral protrusion is at least one second tab; and wherein said at least one first tab is removably disposed in a corresponding one of said plurality of protruded bands and said at least one second tab is removably disposed in another corresponding one of said plurality of protruded bands to removably secure said DIN rail and said plurality of circuit breakers to the panel member of said electrical enclosure, without a number of separate fasteners.

17. The electrical enclosure of claim 15 wherein said number of first resilient legs of said mounting assembly is a first resilient leg; wherein said number of second resilient legs of said mounting assembly is a second resilient leg; wherein said DIN rail of said mounting assembly further comprises a first side and a second side disposed opposite the first side;

wherein said first resilient leg is coupled to one of: (a) the first side of said DIN rail, and (b) the second side of said DIN rail, at or about the first end of said DIN rail; wherein said second resilient leg is coupled to one of: (a) the first side of said DIN rail, and (b) the second side of said DIN rail, at or about the second end of said DIN rail; wherein said at least one first lateral protrusion is a first tab; wherein said at least one second lateral protrusion is a second tab; and wherein said first tab and said second tab extend one of: (a) laterally inwardly toward each other, and (b) laterally outwardly away from each other.

18. The electrical enclosure of claim 15 wherein said number of first resilient legs of said mounting assembly is a pair of first resilient legs; wherein said number of second resilient legs of said mounting assembly is a pair of second resilient legs; wherein said at least one first lateral protrusion is a first tab disposed on one leg of said pair of first resilient legs and a second tab disposed on the other leg of said pair of first resilient legs; wherein said first tab and said second tab extend one of: (a) laterally inwardly toward each other, and (b) laterally outwardly away from each other; wherein said one leg of said pair of first resilient legs extends outwardly from the first edge of said DIN rail at or about the first end of said DIN rail; wherein said other leg of said pair of first resilient legs extends outwardly from the second edge of said DIN rail at or about the first end of said DIN rail; wherein said at least one second lateral protrusion is a third tab disposed on one leg of said pair of second resilient legs and a fourth tab disposed on the other leg of said pair of second resilient legs; wherein said third tab and said fourth tab extend one of: (a) laterally inwardly toward each other, and (b) laterally outwardly away from each other; wherein said one leg of said pair of second resilient legs extends outwardly from the first edge of said DIN rail at or about the second end of said DIN rail; and wherein said other leg of said pair of second resilient legs extends outwardly from the second edge of said DIN rail at or about the second end of said DIN rail.

\* \* \* \* \*